United States Patent [19]
Poisner

[11] Patent Number: 5,652,895
[45] Date of Patent: Jul. 29, 1997

[54] COMPUTER SYSTEM HAVING A POWER CONSERVATION MODE AND UTILIZING A BUS ARBITER DEVICE WHICH IS OPERABLE TO CONTROL THE POWER CONSERVATION MODE

[75] Inventor: David I. Poisner, Folsom, Calif.

[73] Assignee: Intel Corporation, Santa Clara, Calif.

[21] Appl. No.: 578,035

[22] Filed: Dec. 26, 1995

[51] Int. Cl.$^6$ ...................................................... G06F 1/32
[52] U.S. Cl. .......................................... 395/750; 364/707
[58] Field of Search ............................... 395/750, 550, 395/375, 838, 560; 364/707, 492

[56] References Cited

U.S. PATENT DOCUMENTS

| | | | |
|---|---|---|---|
| 4,747,041 | 5/1988 | Engle et al. | 395/750 |
| 5,167,024 | 11/1992 | Smith et al. | 395/375 |
| 5,404,544 | 4/1995 | Crayford | 395/750 |
| 5,404,546 | 4/1995 | Stewart | 395/750 |
| 5,428,790 | 6/1995 | Harper et al. | 395/750 |
| 5,452,434 | 9/1995 | MacDonald | 395/550 |
| 5,471,625 | 11/1995 | Mussemann et al. | 395/750 |
| 5,477,476 | 12/1995 | Schanin et al. | 364/707 |

*Primary Examiner*—Gopal C. Ray
*Attorney, Agent, or Firm*—Blakely, Sokoloff, Taylor & Zafman

[57] ABSTRACT

A digital system bus and its attached devices can be powered down and up using only its standard bus request and bus grant signal lines, without adding additional lines for control signals. By asserting the bus grant signal in the absence of the bus request signal, the bus arbiter device can signal other devices on the bus that is okay to enter a deep power conservation mode. In this mode, the devices on the bus may safely ignore bus activity—except they must monitor for a negation of the bus grant signal or for any system wake-up events for which they are responsible. Substantial power reduction can be achieved in such a mode, since clocks can be suspended to a large portion of the circuitry in the computer system. To wake up the non-arbiter devices, the bus arbiter simply negates the bus grant signal. To wake up the bus arbiter device, a non-arbiter device simply asserts its bus request signal. This deep power conservation mode may be enabled under software control, by means of software writing an enable bit in one or more of the bus devices.

27 Claims, 5 Drawing Sheets

5,652,895

COMPUTER SYSTEM HAVING A POWER CONSERVATION MODE AND UTILIZING A BUS ARBITER DEVICE WHICH IS OPERABLE TO CONTROL THE POWER CONSERVATION MODE

FIELD OF THE INVENTION

The present invention relates to power conservation within a digital computer system. In particular, it relates to controlling a deep power conservation mode across a bus without adding lines to the bus.

BACKGROUND OF THE INVENTION

Reducing the power consumed by a computer system has two significant advantages: (1) less power must be supplied to the computer system; and (2) less heat must be dissipated by the computer system and by the surrounding environment. On a warm day, many businesses pay both for the electricity to power their computer systems and for the electricity to air condition away the heat their computer systems generate.

Reducing power consumption is especially important in the case of a portable computing system, such as a hand-held or notebook-size computing system. Because the size, weight and storage capacity of a portable battery is limited, conserving power is critical in portable devices, which often must be operable for several hours using only the power supplied by an internal battery. Further, portable devices generally must dissipate the heat they generate without the assistance of the mechanical heat sinks or radiators and cooling fans that can easily be used in a desk-top or rack-mount computer system. Elevated temperatures within a Computing system can make its components operate unreliably or have shortened lifetimes.

Reducing power consumption in desk-top personal computers (PCs) has recently become a major priority. In an office environment, personal computers are often left powered up all day, and sometimes 24 hours a day. In part, this is because booting a PC can take several minutes after power is restored until the PC is usable. In part, PCs are left on because of user inattention to energy conservation. Nevertheless, it is a small percentage of the day, or sometimes even a small percentage of the business day, that a typical PC is actually operating usefully. While a single personal computer consumes only a modest amount of power, they add up—tens of PCs may be left on at a particular business office, and tens of thousands of PCs may be left on in a particular city.

Thus, there is a need for a way to deeply reduce the power consumption of an inactive computer system.

It may be desirable to meet this need by cutting off power to some of the computer system's internal circuits, while leaving it in a state where the lengthy, software-controlled boot process is not required. While such an approach can reduce power substantially, cutting off power to a circuit within a PC has significant disadvantages. First, the isolation field effect transistors (FET's) and multiple power wiring planes that must be added to a computer system to switch off power to portions of its circuitry add significant additional costs to its manufacture. Second, even if the contents of all memories remain undisturbed so as to avoid the boot process, a noticeable amount of time must be allowed for all portions of the circuitry to regain normal operating voltages before any computing activity may resume.

Thus, there is a need for a way to deeply reduce the power consumption of an inactive computer system without significantly increasing its manufacturing costs or requiring significant re-start time.

SUMMARY OF THE INVENTION

The present invention is a computer system having a deep power conservation mode that is controlled across a bus without adding bus lines. In addition to saving the bus lines themselves, conserving bus lines results in fewer pins being required on the circuits connected to the bus. In addition to saving the power consumed in monitoring and driving the bus, substantial portions of the circuitry of a typical computer system can be made quiescent when activity on its system bus is suspended.

A bus request signal line within a typical computer system bus is asserted by a requesting device when it needs to become active as the bus master. After receiving this signal, and after waiting for the bus to become available, a bus arbiter device asserts a bus grant signal line within the bus. In this standard protocol, the bus grant signal is never asserted prior to, or for a substantial period after, the bus request signal. By asserting the bus grant signal in the absence of the bus request signal, the bus arbiter can signal other devices on the bus that it is okay to enter a deep power conservation mode.

Significant power reduction can be achieved in such a deep power conservation mode, or global standby mode, because clocks can be suspended to a substantial amount of bus interface circuitry and to adjacent circuitry as well. In some computer system designs, the "adjacent" circuitry to which clocks can be suspended may be the majority of the computer system. Because most circuits in computer systems are clocked, suspending the clock to a circuit can eliminate or substantially reduce transistor transitions within it, and thus substantially reduce power consumption within the computer system.

In the global standby mode of the present invention, power is left on to the circuits within the computer system. This allows the system to wake up substantially more quickly than power reduction techniques that turn off power to portions of the computer system.

BRIEF DESCRIPTION OF THE DRAWINGS

The invention is illustrated in the following drawings, in which known circuits are shown in block-diagram form for clarity. These drawings are for explanation and for aiding the reader's understanding. The invention should not be taken as being limited to the embodiments and design alternatives illustrated.

DETAILED DESCRIPTION OF THE INVENTION

Operation of the Invention

Figure 1:
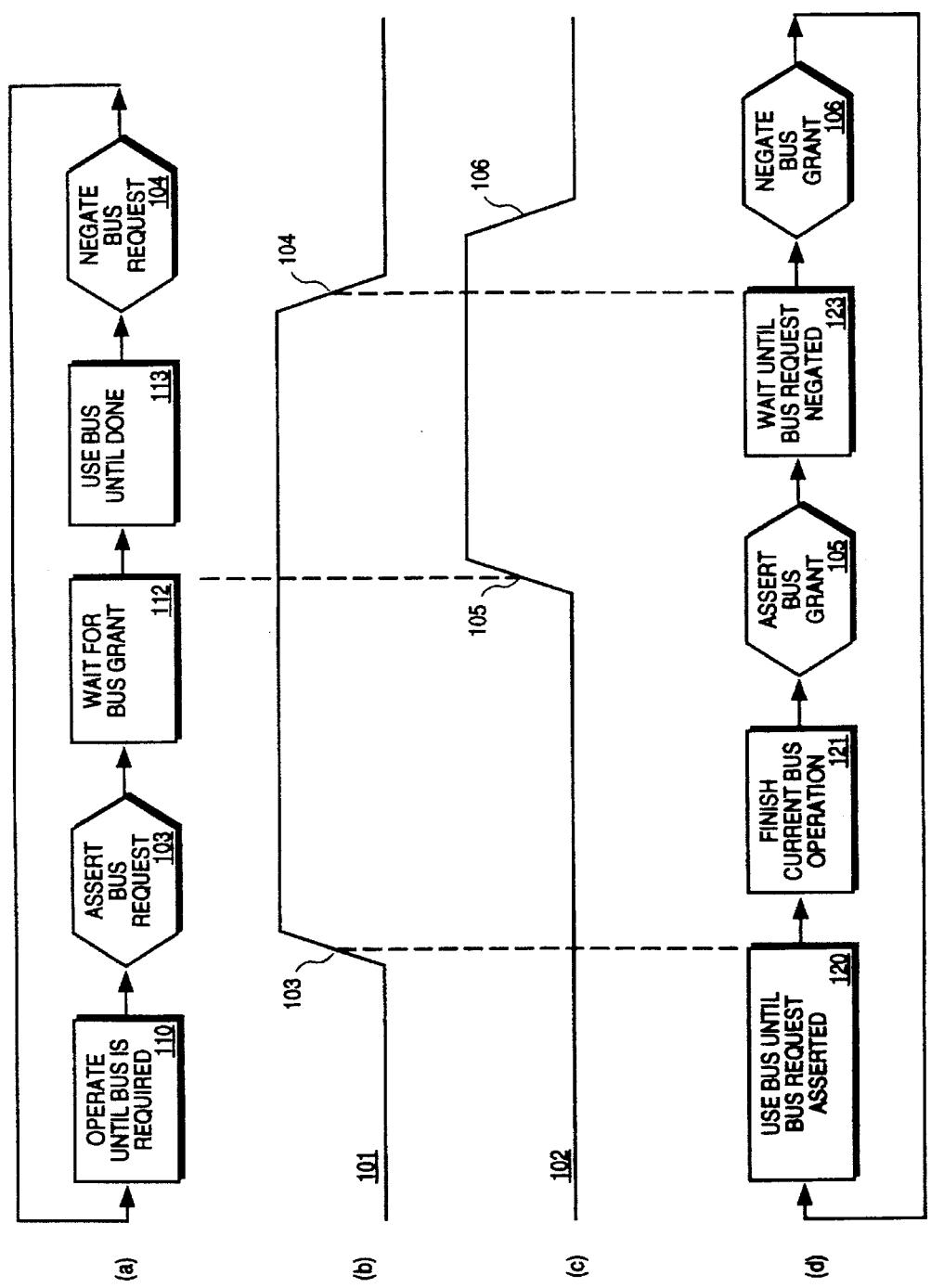
FIG. 1 shows the timing relationships, as practiced in the prior art, of the bus request signal, FIG. 1(b), and the bus grant signal, FIG. 1(c). It also shows the states through which the non-arbiter bus device, FIG. 1(a), and the bus arbiter device, FIG. 1(d), pass through relative to these timing signals.

Various alternative embodiments of and designs for the present invention are disclosed herein. The invention, however, should not be taken as being limited to the embodiments and design alternatives described. One skilled in the art will recognize alternative embodiments and various changes in form and detail that may be employed while practicing the invention without departing from its principles, spirit or scope.

Commercial computer systems are typically manufactured largely out of integrated circuits fabricated using complimentary metal oxide silicon (CMOS) technology. A CMOS transistor consumes substantial power when it transitions from its on-state to its off-state or visa versa. But it consumes little power when it is quiescent. Thus, substantial savings and power consumption can be achieved by eliminating such transitions according to the present invention.

One of the bus devices that enters deep power conservation mode may generate or control the clocks of other portions of the system that can be suspended when in deep power conservation mode. In this case, this device suspends and re-enables the clocks when it enters and leaves deep power conservation mode.

Entering deep power conservation mode may be enabled by software when it detects that the system has been inactive for a while. In the case where the software can write control bits within the arbiter or the non-arbiter devices, it can enable the deep power conservation mode by writing a control bit in one or more of the devices.

In one embodiment of the invention, any non-arbiter devices on the bus may ignore bus activity during deep power conservation mode, other than a negation of the bus grant signal. They need not drive any signals on the bus. The bus arbiter device may ignore bus activity other than an assertion of the bus request signal. It needs only drive a steady bus request signal on the bus.

In addition, each device on the bus must continue to monitor for any event which it would handle during normal operation that is a system wake-up event if it occurs during deep power conservation mode—the user pressing a key, for example. Such wake-up events are typically received by the sleeping bus devices either via dedicated interrupt request or direct memory access (DMA) request lines.

If the device containing the bus arbiter generates a wake-up event or receives one from an external device, then it negates the bus grant signal, re-enables its clocks and resumes its normal operation. In response to the negation of the bus grant signal, the other devices on the bus that went into deep power conservation mode, re-enable their clocks and resume their normal operation.

Alternatively, if a wake-up event occurs either within a non-arbiter device or in circuitry attached to it, then it asserts the bus request signal. In response to this assertion, the bus arbiter negates the bus grant signal, re-enables its clocks and resumes normal operation. In response, the non-arbiter device negates the bus request signal, re-enables its clocks and resumes normal operation.

Typical computer systems involve buses, by means of which the various devices connected to the bus communicate information back and forth. Buses are usually clocked, such that bus information transfers and commands are synchronized with a bus clock timing signal. Even when the computing system is not performing any useful work, the clock signals on the bus are typically active and the numerous transistors directly and indirectly coupled to these clocks are consuming substantial power.

Bus architectures for digital systems usually allow one or more attached devices, called bus masters or non-arbiter devices, to occasionally take control of the bus, i.e. to drive the address and control lines within the bus so that the other devices attached to the bus respond with the information requested. Typically, a bus comprises one pair of bus request and bus grant signal lines for each device attached to the bus that is able to become a bus master. If more than one device requests the bus at the same time, the bus arbiter arbitrates among them to select the next active bus master. The bus arbiter device is the default bus master.

FIGS. 1(b) and 1(c) are, respectively, timing diagrams of bus request signal 101 and bus grant signal 102 in the bus request and grant protocol of the prior art. Bus request signal 101, which appears on a wire within the bus, is asserted 103 by a requesting, non-arbiter bus device when it needs to become the active bus master. After assertion 103, and after waiting for the bus to become available, the bus arbiter asserts 105 bus grant signal 102, which appears on another wire within the bus. Then, the requesting device functions for a time as the active bus master, after which it negates 104 bus request signal 101. Then, the bus arbiter negates 106 bus grant signal 102. In this standard protocol, bus grant signal 102 is never asserted prior to, or for a substantial period after, bus request signal 101.

FIG. 1(a) is a state machine diagram of the non-arbiter bus device in this same prior art bus request and grant protocol. In state 110, the non-arbiter bus device is operating without needing to control the bus. State 110 ends when it becomes necessary for this device to become the active bus master. At that time, the device asserts 103 bus request signal 101, and transitions to state 112. In state 112, the non-arbiter device waits for bus grant signal 102 to be asserted by the bus arbiter device. State 112 is terminated by assertion 105 of bus grant signal 102. Then, the non-arbiter device transitions to state 113, during which it uses the bus as the active bus master until it is done with the bus. At that time, the non-arbiter bus device negates 104 bus request signal 101 and transitions back to state 110.

FIG. 1(d) is a state machine diagram of the arbiter bus device in this same prior art bus request and grant protocol. In state 120, the arbiter bus device uses the bus as it requires. State 120 is terminated by assertion 103 of bus request signal 101, at which time state 121 is entered. In state 121, the bus arbiter device finishes, or allows to finish, any bus operation that is currently pending or that has higher priority than bus request signal 101. Then, it asserts 105 bus grant signal 102 and transitions to state 123. In state 123, the bus arbiter device is precluded from acting as the bus master. State 123 ends when the non-arbiter bus device negates 104 bus request signal 101. Then, the bus arbiter device negates 106 bus grant signal 102 and transitions back to state 120.

An Example Computer System that Uses the Invention

Figure 2:
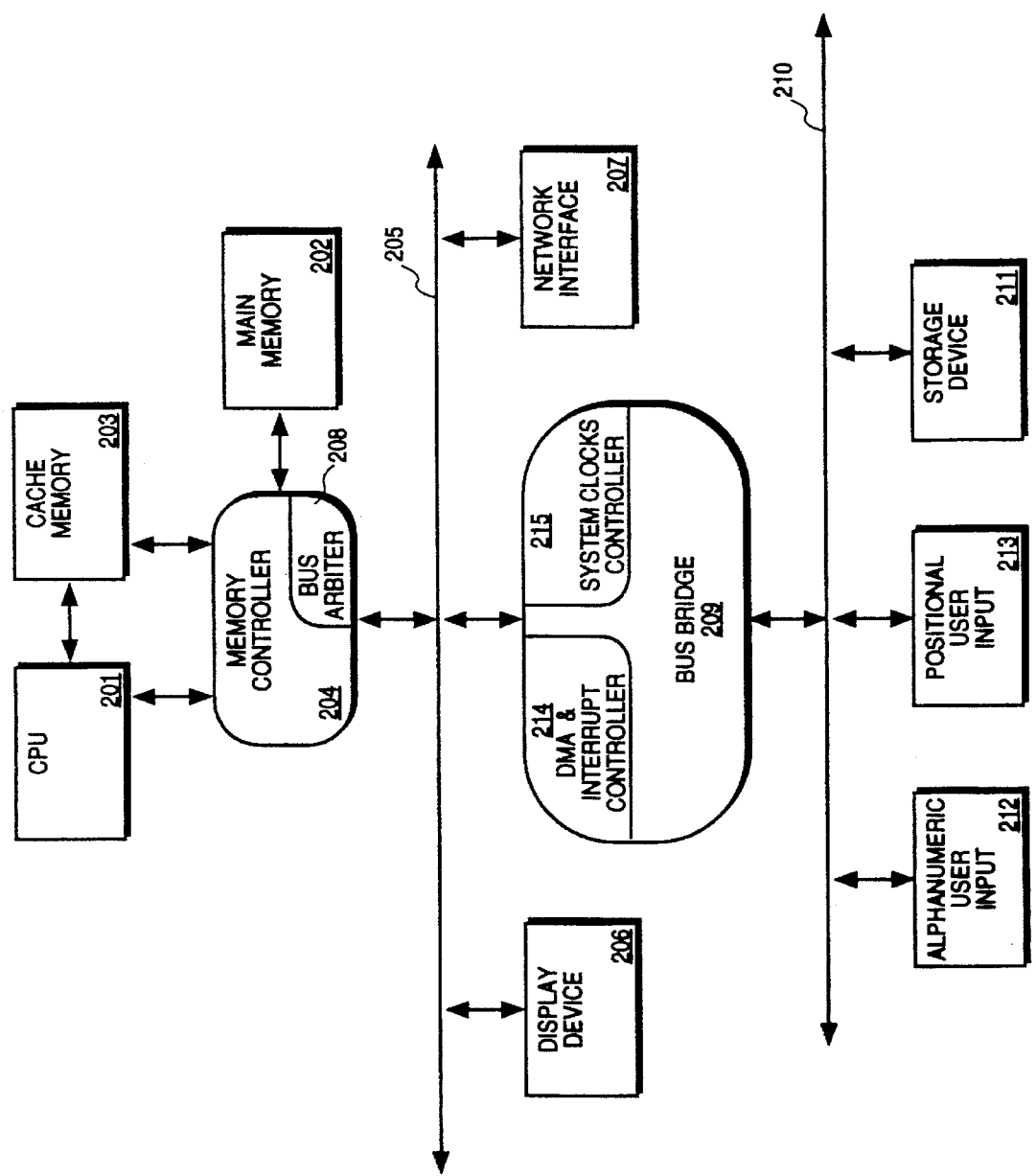
FIG. 2 illustrates the overall architecture and the major components of a computer system in which the present invention can be used.

FIG. 2 is a system architecture diagram of one particular computer system in which the present invention is used. It will be obvious to one skilled in the art that the present invention can be advantageously used in a wide variety of computer system architectures.

The example computer system of FIG. 2 comprises a central processing unit (CPU) 201 for processing digital data. Main memory 202 comprises random access memory (RAM) or some other dynamic information storage. Cache memory 203 comprises high speed RAM or other dynamic storage for holding instructions and data frequently or recently accessed by CPU 201 from main memory 202. Cache memory 203 is coupled to CPU 201 to reduce its access time to main memory 202. CPU 201, main memory 202, and cache memory 203 are each coupled to memory controller 204. Memory controller 204 directs data traffic among them, and bridges control signals and data traffic from these components to high speed bus 205.

High speed bus 205 supports peripherals operating at high data throughput rates. High speed bus 205 may implement one of several bus standards such as the peripheral component interconnect (PCI) bus or VESA local bus (VL-Bus). Display device 206 and network interface 207 are coupled to high speed bus 205. Display device 206, and its associated controller (not shown), present graphical output to the user on a display such as a cathode ray tube (CRT) or liquid crystal display (LCD). Network interface 207 links this example computer system with other computers across a network. Both display device 206 and network interface 207 have high data transfer requirements, and thus are advantageously located on high speed bus 205 rather than I/O bus 210.

Input/Output (I/O) bus 210 is used for communicating information to and from peripheral devices that operate at lower throughput rates. I/O bus 210 may implement one of several bus standards such as the industry standard architecture (ISA) bus. A data storage device 211, such as a hard, floppy, or optical disk drive, is coupled to I/O bus 210 for storing or transferring information. An alphanumeric user input device 212, including alphabetic, numeric and command keys, is coupled to bus 210 for communicating information from the user to CPU 201. A positional user input device 213, such as a mouse or trackball, is coupled to bus 210 by means of which the user communicates cursor control information to CPU 201.

In the computer System shown in FIG. 2, memory controller 204 comprises arbiter 208 for high speed bus 205 and is the default master of high speed bus 205. High speed bus 205 also comprises bus request signal 101 and bus grant signal 102, as described above in reference to FIG. 1. If a non-arbiter bus device (such as bus bridge 209) attached to high-speed bus 205 wants to take control of it, then that device can do so by means of the above described protocol.

Bus bridge 209 couples control signals, address information and data traffic between I/O bus 210 and high-speed bus 205. It performs any translation or buffering needed. In this example embodiment, bus bridge 209 further comprises DMA and interrupt controller 214 and system clock controller 215. System clock controller 215 generates or controls the generation of the clocks used by substantial portions of the circuitry within both bus bridge 209 and memory controller 204. In one embodiment of the present invention, system clock controller 215 operates during deep power conservation mode, to suspend clocks to DMA and interrupt controller 214 and to a universal serial bus (USB) controller within bus bridge 209. It further operates to suspend clocks to a memory controller and interface and a cache controller and interface within memory controller 204.

The present invention could also be employed to allow memory controller 204 to place either or both of display device 206 and network interface 207 into global standby mode. Typically, high-speed bus 205 comprises a bus request and bus grant signal for each device capable of becoming its master. To enter global standby mode, the bus arbiter device would simultaneously signal each non-arbiter device that it is okay to enter the power conservation mode by asserting its respective bus grant signal. Alternatively, some embodiments of the present invention could selectively determine which devices should be placed into standby mode under what circumstances, and accordingly only assert a subset of the bus grant signals within high-speed bus 205.

To leave global standby mode, any non-arbiter device could assert its bus request line and the arbiter device would then negate all bus grant lines. Alternatively, some embodiments of the present invention could selectively determine which devices should be awakened under what circumstances.

Entering Power Conservation Mode

FIGS. 3(b) and 3(c) are, respectively, timing diagrams according to one embodiment of the present invention of bus request signal 101 and bus grant signal 102 when the power conservation mode is entered. The bus arbiter device asserts 301 bus grant signal 102 in the absence of bus request signal 101 being asserted.

FIG. 3(d) is a state machine diagram according to one embodiment of the present invention of the bus arbiter device (such as memory controller 208 as shown in FIG. 2) when the power conservation mode is entered. In state 320, the arbiter bus device operates normally. State 320 may be terminated when software executing on CPU 201 detects that it is time to enter the deep power conservation mode of the present invention, such as by a time-out occurring since the last I/O event or CPU computation. At this time, the software signals 330 the bus arbiter device, such as by writing a control bit within it. Software signal 330 terminates state 320 and the bus arbiter transitions to state 321.

It will be clear to one skilled in the art that a wide variety of mechanism can be used to trigger entering the power conservation mode without departing from the spirit or scope of the present invention. For example, the power conservation mode may be entered: (1) when an external event occurs, such as the user pressing a power-save button on the keyboard; (2) when hardware detects that a certain amount of time has elapsed since the last activity in the computer system; (3) when the operating system controlling the computer system detects that a certain amount of time has elapsed since the last activity in the computer system; or (4) when the operating system controlling the computer system receives a command from the user, or from a network interface or a communications port.

In state 321, the bus arbiter device waits for the software to similarly signal the non-arbiter device. State 321 terminates when the software signals 331 the non-arbiter device, or when another event triggers entering the power conservation mode, as described above. Then the bus arbiter asserts 301 bus grant signal 102 and transitions into power conservation state 323. By monitoring and waiting for the software to signal 331 the non-arbiter device before asserting 301 bus grant signal 102, the bus arbiter device avoids a race condition, in which it could be indeterminate whether software signal 331 occurs prior to, or after, assertion 301 of bus grant signal 102.

FIG. 3(a) is a state machine diagram according to one embodiment of the present invention of the non-arbiter bus device (such as bus bridge 209) when the power conservation mode is entered. In state 310, the non-arbiter device operates normally. State 310 ends when it receives software signal 331, or when another event triggers entering the power conservation mode, as described above. At this time, it transitions to state 311, in which it waits for assertion 301 of bus grant signal 102. When assertion 301 of bus grant signal 102 occurs, it transitions into power conservation state 312.

In the example embodiment of the invention shown in FIG. 2, the non-arbiter device comprises system clocks controller 215. System clocks controller 215 directly generates or indirectly controls the generation of many of the clocks used in the computer system, including the clocks that drive the bus arbiter device, i.e. memory controller 204. In this embodiment, the bus arbiter device asserting bus grant in the absence of bus request signals the non-arbiter device not only that it is time to put itself into power reduction mode but also that the bus arbiter device is ready to have its clocks stopped by the clock circuitry within the non-arbiter device.

Figure 3:
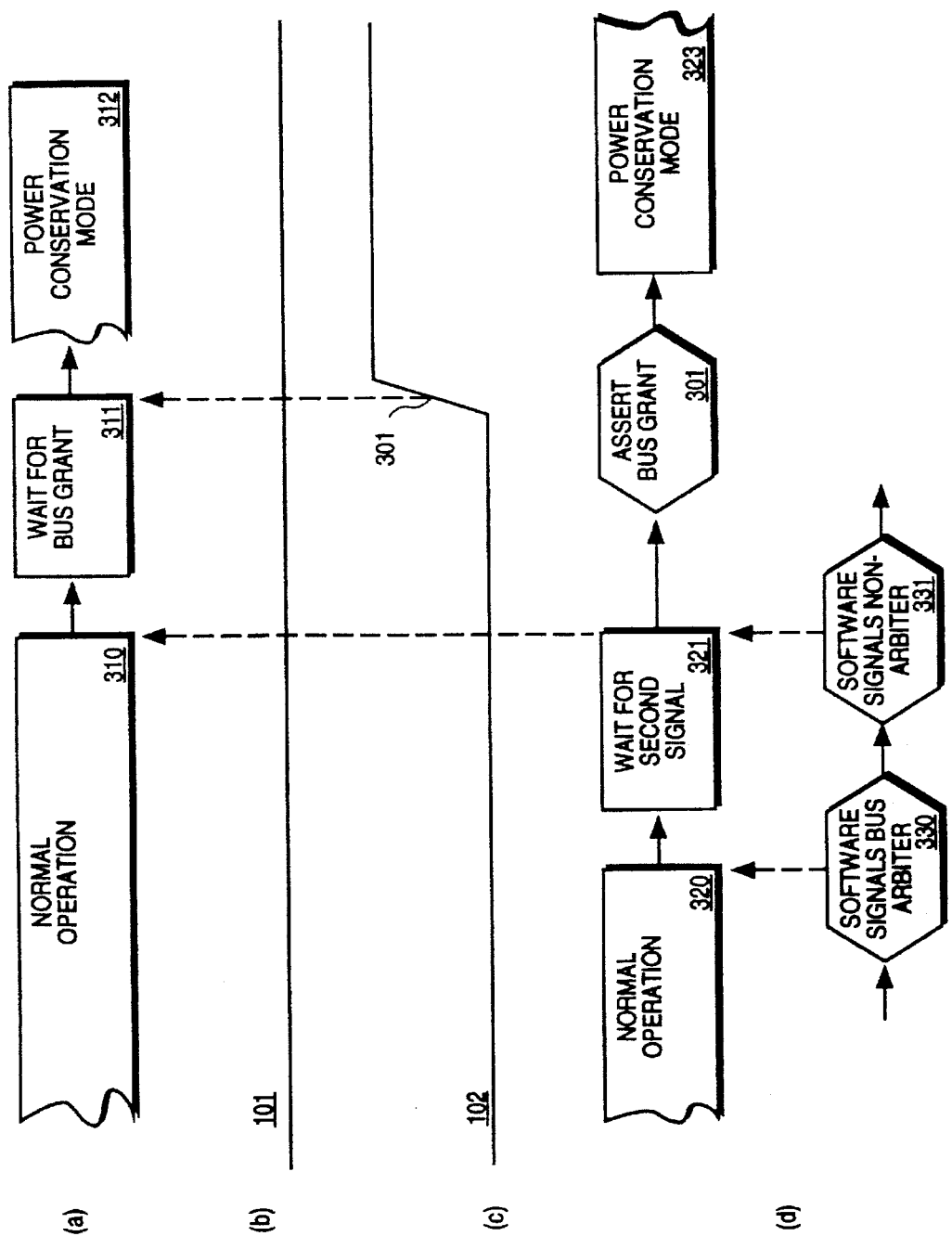
FIG. 3 shows the timing relationships, according to the present invention, of the bus request signal, FIG. 3(b), and the bus grant signal, FIG. 3(c), when the power conservation mode is entered. It also shows the corresponding states through which the non-arbiter bus device, FIG. 3(a), and the bus arbiter device, FIG. 3(d), pass.

System wake-up events can occur at any time, including during the transition into power reduction mode shown in FIG. 3. If the non-arbiter device receives a system wake-up event after software signal 330 but prior to receiving assertion 301 of bus grant signal 102, then it asserts bus request signal 101 and does not enter power conservation mode 312 in response to assertion 301. If the arbiter device receives a system wake-up event after software signal 330 but prior to asserting 301 bus grant signal 102, then it does not assert 301 bus grant signal 102. One of the types of wake-up events that the arbiter device may receive is an assertion of bus request signal 101 from the non-arbiter device.

Leaving Power Conservation Mode

Figure 4:
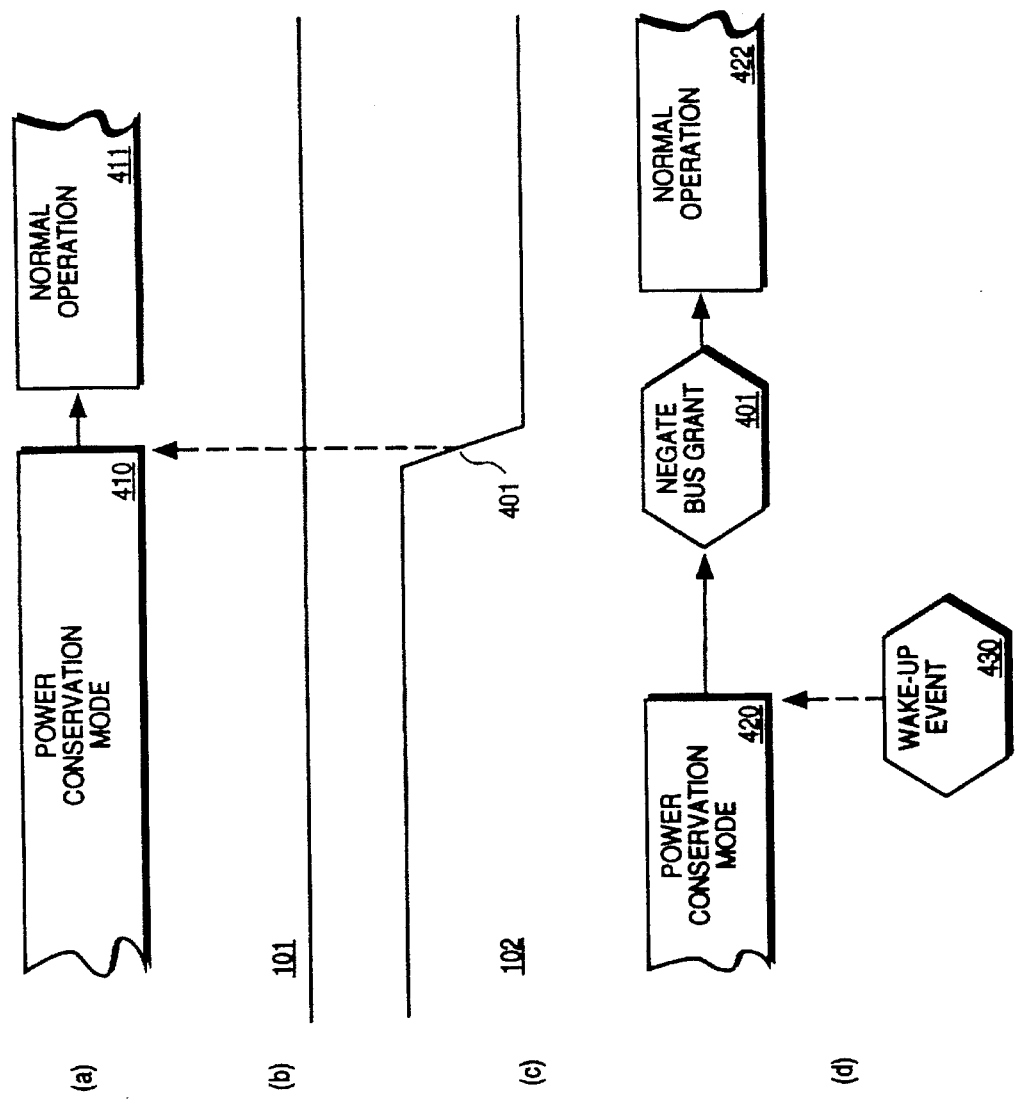
FIG. 4 shows the timing relationships, according to the present invention, of the bus request signal, FIG. 4(b), and the bus grant signal, FIG. 4(c), when the bus arbiter device initiates system wake-up. It also shows the corresponding states through which the non-arbiter bus device, FIG. 4(a), and the bus arbiter device, FIG. 4(d), pass.

FIGS. 4(b) and 4(c) are, respectively, timing diagrams according to one embodiment of the present invention of bus request signal 101 and bus grant signal 102 when the bus arbiter device initiates system wake up. The bus arbiter device negates 401 bus grant signal 102. Bus request signal 101 remains negated.

FIG. 4(d) is a state machine diagram according to one embodiment of the present invention of the arbiter bus device when it initiates system wake up. In state 420, the arbiter bus device is in power conservation mode. State 420 terminates upon occurrence 430 of a wake-up event that is generated by or that arrives at the arbiter bus device. In general, the bus arbiter device must remain responsive to any types of wake-up events that it would handle during normal system operation. Typically these events are received by the bus arbiter device as a level-sensitive signal, such as a bus request.

In the example embodiment of the invention as shown in FIG. 2, the only wake-up events that bus arbiter 208 need monitor are bus request signals from bus bridge 209 or any other non-arbiter bus master coupled to high speed bus 205. This embodiment supports a maximum of four such devices plus bus bridge 209. For example, display device 206, network interface 207, a storage device (not shown), and a universal serial bus (USB) interface (not shown) could each be capable of becoming the active bus master by asserting their respective bus request line. Each of these non-arbiter bus masters plus bus bridge 209 could initiate system wake-up by asserting their respective bus request line.

In this same embodiment of the invention, bus bridge 209 further comprises DMA and interrupt controller 214. DMA and interrupt controller 214 queues, prioritizes and manages interrupts for CPU 201. It also manages requests for DMA transfers involving high speed bus 205. In this embodiment, the only wake-up events that bus bridge 209 need monitor are the DMA and interrupt requests received by DMA and interrupt controller 214 and the negation of bus grant signal 102 from memory controller 204.

FIG. 4(a) is a state machine diagram according to one embodiment of the present invention of the non-arbiter bus device when the bus arbiter device initiates system wake up. Power conservation state 410 is terminated by negation 401 of bus grant signal 102. At this time, the non-arbiter bus resumes normal operation in state 411.

Figure 5:
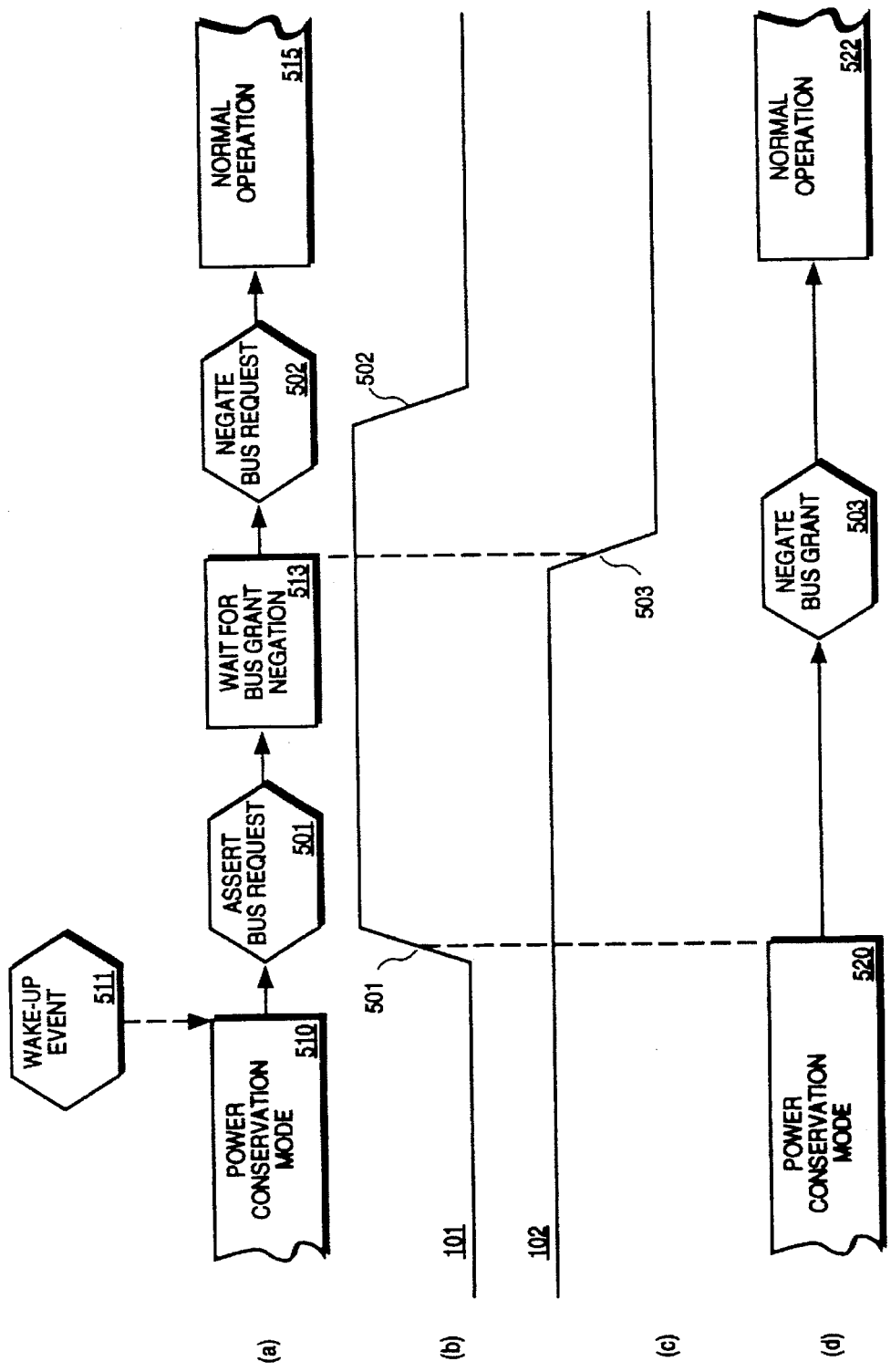
FIG. 5 shows the timing relationships, according to the present invention, of the bus request signal, FIG. 5(b), and the bus grant signal, FIG. 5(c), when the non-arbiter device initiates system wake-up. It also shows the corresponding states through which the non-arbiter bus device, FIG. 5(a), and the bus arbiter device, FIG. 5(d), pass.

FIGS. 5(b) and 5(c) are, respectively, timing diagrams according to one embodiment of the present invention of bus request signal 101 and bus grant signal 102 when the non-arbiter device initiates system wake up. Power conservation state 510 is terminated by occurrence 511 of a wake-up event that is generated by or that arrives at bus bridge 209. As discussed above, this could be, for example, a user keystroke from alphanumeric user input device 212, a mouse movement from positional user input device 213, or an interrupt or DMA request from storage device 211 or network interface 207.

In response to such a wake-up event, the non-arbiter device asserts 501 bus request signal 101. Then, the bus arbiter device negates 503 bus grant signal 102, and then the non-arbiter device negates 502 bus request signal 101.

FIG. 5(a) is a state machine diagram of the non-arbiter bus device when it initiates system wake up. In state 510, the non-arbiter bus device is in power conservation mode. State 510 terminates upon the receipt of wake-up event 511 by the non-arbiter bus device. The non-arbiter bus device asserts 501 bus request signal 101 and transitions to state 513. In state 513, it waits for negation 503 of bus grant signal 102. When that occurs, it negates 502 bus request signal 101 and transitions to normal operation state 515.

FIG. 5(d) is a state machine diagram of the arbiter bus device when the non-arbiter device initiates system wake up. In state 520, the bus arbiter device is in power conservation mode. State 520 is terminated by assertion 501 of bus request signal 101. In response, the bus arbiter device negates 503 bus grant signal 102 and transitions to normal operation state 522.

Conclusion

As illustrated herein, the invention disclosed provides a novel and advantageous method and apparatus for controlling a deep power conservation mode across a bus without adding bus lines. One skilled in the art will realize that alternative embodiments, design alternatives and various changes in form and detail may be employed while practicing the invention without departing from its principles, spirit or scope. The following claims indicate the scope of the invention. Any variation which comes within the meaning of, or range of equivalency of, any of these claims is within the scope of the invention.

What is claimed is:

1. A computer system having a power conservation mode, comprising:

a) a bus comprising a bus request signal and a bus grant signal;

b) an arbiter device, coupled to said bus, operable to generate, responsive to said bus request signal, said bus grant signal to grant control of said bus, and operable to assert said bus grant signal while said bus request signal is negated and to enter said power conservation mode; and c) a non-arbiter device, coupled to said bus, operable to generate said bus request signal to request control of said bus, to negate said bus request signal, and to enter said power conservation mode in response to said bus grant signal occurring while said bus request signal is negated.

2. The computer system of claim 1, further comprising:

a) a central processing unit (CPU) operable to signal said arbiter device and said non-arbiter device to enable said power conservation mode;

said arbiter device being operable to monitor the signaling of said non-arbiter device, said arbiter device asserting said bus grant signal and entering said power conservation mode in response to said CPU signaling of said non-arbiter device; and said non-arbiter device entering said power conservation mode subsequent to receiving said CPU signal.

3. The computer system of claim 2, wherein when said arbiter device receives a wake-up event subsequent to receiving said CPU signal and prior to asserting said bus grant signal, said arbiter device, in response to said CPU signaling said non-arbiter device, neither asserts said bus grant signal nor enters said power conservation mode.

4. The computer system of claim 2, wherein when said non-arbiter device receives a wake-up event subsequent to receiving said CPU signal and prior to receiving said bus grant signal, said non-arbiter device asserts said bus request signal and does not enter said power conservation mode in response to receiving said bus grant signal.

5. The computer system of claim 1, wherein said non-arbiter device comprises clock circuitry operable to suspend clock Signals to at least one portion of said computer system during said power conservation mode.

6. The computer system of claim 5, wherein said at least one portion of said computer system includes one or more of a dynamic memory array, a memory controller and interface, a cache controller and interface, a display device, and a network interface.

7. A method of entering a power conservation mode in a computer system comprising a central processing unit (CPU), a bus which comprises a bus request signal and a bus grant signal, an arbiter device coupled to said bus, and a non-arbiter device coupled to said bus, said non-arbiter device generating said bus request signal to request control of said bus, and said arbiter device generating, responsive thereto, said bus grant signal to grant control of said bus, the method comprising:

said non-arbiter device negating said bus request signal;

said arbiter device asserting said bus grant signal while said bus request signal is negated and entering said power conservation mode; and said non-arbiter device entering said power conservation mode responsive to said assertion of said bus grant signal while said bus request signal is negated.

8. The method of claim 7, further comprising:

software executing on said CPU signaling said arbiter device to enable said power conservation mode;

said software signaling said non-arbiter device to enable said power conservation mode; and said arbiter device monitoring said software signaling of said non-arbiter device and asserting of said bus grant signal responsive thereto.

9. The method of claim 8, wherein when said arbiter device receives a wake-up event subsequent to receiving said software signal and prior to asserting said bus grant signal, said arbiter device neither asserts said bus grant signal nor enters said power conservation mode in response to said software signaling said non-arbiter device.

10. The method of claim 8, wherein when said non-arbiter device receives a wake-up event subsequent to receiving said software signal and prior to receiving said bus grant signal, said non-arbiter device asserts said bus request signal and does not enter said power conservation mode in response to receiving said bus grant signal.

11. The method of claim 7, further comprising the steps of:

said non-arbiter device supplying a clock signal to said arbiter device; and said arbiter device entering said power conservation mode by means of said non-arbiter device suspending said clock signal.

12. A computer system having a power conservation mode, comprising:

a bus comprising a bus request signal and a bus grant signal;

an arbiter device, coupled to said bus, operable to generate, in response to said bus request signal, said bus grant signal to grant control of said bus, and operable to assert said bus grant signal while said bus request signal is negated and to enter said power conservation mode, and further operable in response to receiving a wake-up event to negate said bus grant signal and leave said power conservation mode; and a non-arbiter device, coupled to said bus, operable to generate said bus request signal to request control of said bus, and operable during said power conservation mode to monitor said bus grant signal and to leave said power conservation mode in response to said negation of said bus grant signal.

13. The computer system of claim 12, wherein said non-arbiter device comprises clock circuitry operable to suspend a clock signal to at least one portion of said computer system during said power conservation mode.

14. The computer system of claim 13, wherein said at least one portion of said computer system includes one or more of a dynamic memory array, a memory controller and interface, a cache controller and interface, a display device, and a network interface.

15. A method of leaving a power conservation mode in a computer system comprising a bus which comprises a bus request signal and a bus grant signal, an arbiter device coupled to said bus, and a non-arbiter device coupled to said bus, said non-arbiter device generating said bus request signal to request control of said bus, and said arbiter device generating, in response thereto, said bus grant signal to grant control of said bus, said method comprising:

said non-arbiter device, in response to receiving a wake-up event during said power conservation mode, asserting said bus request signal and leaving said power conservation mode;

said arbiter device monitoring said bus request signal during said power conservation mode and, responsive to said assertion thereof, leaving said power conservation mode and negating said bus grant signal; and said non-arbiter device, subsequent to leaving said power conservation mode, monitoring said bus grant signal and, responsive to said negation thereof, negating said bus request signal.

16. The method of claim 15, further comprising the steps of:

said non-arbiter device supplying a clock signal to said arbiter device; and said arbiter device entering said power conservation mode by means of said non-arbiter device suspending said clock signal.

17. A computer system having a power conservation mode, comprising:

a) a bus comprising a bus request signal and a bus grant signal;

b) an arbiter device, coupled to said bus, operable to generate, responsive to said bus request signal, said bus grant signal to grant control of said bus, and operable to assert said bus grant signal while said bus request signal is negated and to enter said power conservation mode;

c) a non-arbiter device, coupled to said bus, operable to generate said bus request signal to request control of said bus, to negate said bus request signal, and to enter said power conservation mode in response to said bus grant signal occurring while said bus request signal is negated;

said arbiter device being operable in response to a wake-up event to negate said bus grant signal and to leave said power conservation mode; and said non-arbiter device being operable during said power conservation mode to monitor said bus grant signal and, in response to said negation thereof, to leave said power conservation mode.

18. The computer system of claim 17, further comprising:

a) a central processing unit (CPU) operable to signal said arbiter device and said non-arbiter device to enable said power conservation mode;

said arbiter device being operable to monitor said signaling of said non-arbiter device, said arbiter device asserting said bus grant signal and entering said power conservation mode in response to said CPU signaling of said non-arbiter device; and said non-arbiter device entering said power conservation mode subsequent to receiving said CPU signal.

19. The computer system of claim 18, wherein when said arbiter device receives a wake-up event subsequent to receiving said CPU signal and prior to asserting said bus grant signal, said arbiter device neither asserts said bus grant signal nor enters said power conservation mode in response to said CPU signaling said non-arbiter device.

20. The computer system of claim 18, wherein when said non-arbiter device receives a wake-up event subsequent to receiving said CPU signal and prior to receiving said bus grant signal, said non-arbiter device asserts said bus request signal and does not enter said power conservation mode in response to receiving said bus grant signal.

21. The computer system of claim 17, wherein said non-arbiter device comprises clock circuitry operable to suspend a clock signal to at least one portion of said computer system during said power conservation mode.

22. The computer system of claim 21, wherein said at least one portion of said computer system includes one or more of a dynamic memory array, a memory controller and interface, a cache controller and interface, a display device, and a network interface.

23. A method of entering and leaving a power conservation mode in a computer system comprising a central processing unit (CPU), a bus which comprises a bus request signal and a bus grant signal, an arbiter device coupled to said bus, and a non-arbiter device coupled to said bus, said non-arbiter device generating said bus request signal to request control of said bus, and said arbiter device generating, in response thereto, said bus grant signal to grant control of said bus, and said non-arbiter device negating said bus request signal to release control of said bus, the method comprising:

said arbiter device asserting said bus grant signal while said bus request signal is negated and entering said power conservation mode;

said non-arbiter device entering said power conservation mode responsive to said assertion of said bus grant signal while said bus request signal is negated;

said non-arbiter device, responsive to a wake-up event, asserting said bus request signal and leaving said power conservation mode;

said arbiter device monitoring said bus request signal during said power conservation mode and, in response to said assertion thereof, leaving said power conservation mode and negating said bus grant signal; and said non-arbiter device, subsequent to leaving said power conservation mode, monitoring said bus grant signal and, in response to said negation, negating said bus request signal.

24. The method of claim 23, further comprising:

software executing on said CPU signaling said arbiter device to enable said power conservation mode;

said software signaling said non-arbiter device to enable said power conservation mode; and said arbiter device monitoring said software signaling of said non-arbiter device and asserting said bus grant signal responsive thereto.

25. The method of claim 24, wherein when said arbiter device receives a wake-up event subsequent to receiving said software signal and prior to asserting said bus grant signal, said arbiter device neither asserts said bus grant signal nor enters said power conservation mode in response to said software signaling said non-arbiter device.

26. The method of claim 24, wherein when said non-arbiter device receives a wake-up event subsequent to receiving said software signal and prior to receiving said bus grant signal, said non-arbiter device asserts said bus request signal and does not enter said power conservation mode in response to receiving said bus grant signal.

27. The method of claim 23, further comprising the steps of:

said non-arbiter device supplying a clock signal to said arbiter device; and said arbiter device entering said power conservation mode by means of said non-arbiter device suspending said clock signal.

* * * * *